(12) United States Patent
Ambo et al.

(10) Patent No.: US 6,898,093 B2
(45) Date of Patent: May 24, 2005

(54) POWER CONVERSION CIRCUIT WITH CLAMP AND SOFT START

(75) Inventors: Tatsuaki Ambo, Houston, TX (US); Gary Dean Conner, Cypress, TX (US)

(73) Assignee: Toshiba International Corporation, Houston, TX (US)

( * ) Notice: Subject to any disclaimer, the term of this patent is extended or adjusted under 35 U.S.C. 154(b) by 29 days.

(21) Appl. No.: 10/601,696

(22) Filed: Jun. 24, 2003

(65) Prior Publication Data

US 2004/0264215 A1 Dec. 30, 2004

(51) Int. Cl.[7] .............................................. H02H 7/122
(52) U.S. Cl. ..................... 363/56.05; 363/98
(58) Field of Search .............. 363/56.05, 98, 363/17, 132

(56) References Cited

U.S. PATENT DOCUMENTS

| | | | |
|---|---|---|---|
| 4,864,483 A | 9/1989 | Divan | |
| 5,245,520 A | 9/1993 | Imbertson | |
| 5,268,830 A | 12/1993 | Loftus, Jr. | |
| 5,274,543 A | 12/1993 | Loftus, Jr. | |
| 5,305,191 A | 4/1994 | Loftus, Jr. | |
| 5,434,767 A | 7/1995 | Batarseh et al. | |
| 5,642,273 A | * 6/1997 | Lai et al. | 363/56.12 |
| 5,654,880 A | 8/1997 | Brkovic et al. | |
| 5,719,754 A | 2/1998 | Fraidlin et al. | |
| 5,877,951 A | * 3/1999 | Mweene | 363/98 |
| 6,038,142 A | 3/2000 | Fraidlin et al. | |
| 6,266,260 B1 | * 7/2001 | Zahrte et al. | 363/132 |

* cited by examiner

*Primary Examiner*—Shawn Riley
(74) *Attorney, Agent, or Firm*—Banner & Witcoff, Ltd.

(57) ABSTRACT

A power converter includes a current source providing an input current, a transformer having primary and secondary windings, a switch network coupling the current source and the primary winding, and a clamping circuit coupled to the switch network. An output bus is coupled to the secondary winding and provides an output voltage. A control circuit has inputs based on the output voltage and the input current, and generates switch network control signals based on those inputs. The control circuit also generates clamping circuit control signals based on the switch network control signals. The power converter may also include a start-up control circuit configured to selectively control the switch network and the clamping circuit so as to raise the output voltage to a desired level. In some embodiments, the switch network is a full bridge, and the clamping circuit includes first and second clamping switches.

22 Claims, 11 Drawing Sheets

|  | T1 | T2 | T3 | T4 | T5 | T6 |
|---|---|---|---|---|---|---|
| A(1) [P1] | High | High | Low | Low | Low | Low |
| B(2) [P2] | Low | Low | Low | High | High | Low |
| B(1) [P3] | Low | Low | Low | High | Low | High |
| A(2) [P4] | High | Low | High | Low | Low | Low |
| C | High | High | High | Low | Low | Low |
| D | Low | Low | Low | High | High | High |

FIG. 14

POWER CONVERSION CIRCUIT WITH CLAMP AND SOFT START

FIELD OF THE INVENTION

This invention relates generally to power conversion circuits. In particular, this invention relates to bridge-type power conversion circuit topologies having clamping elements.

BACKGROUND OF THE INVENTION

Various topologies are known for providing a controlled DC power source. One such topology is a full-bridge current-fed design. In such a design, a DC current source is alternately switched between diagonals of a full-bridge switching network on a primary side of a transformer. By controlling the periods during which each diagonal is conducting, a desired output voltage on the secondary side of the transformer can be obtained. However, limiting stresses on semiconductor switching components of the bridge is an inherent challenge in such a topology. Toward that end, a variety of snubber, clamp and other stress-reducing circuit designs have been proposed. In addition to controlling the conduction and non-conduction of the bridge circuit, the stress-reducing circuits typically require some control mechanism.

One example of a full bridge power converter with an active clamp circuit is described in U.S. Pat. No. 6,038,142. In the described system, an active clamp circuit composed of a capacitor and a switching MOSFET is connected across the DC side of a full-bridge network of switching transistors. The voltage across the switching network is monitored during the switching cycle. When that voltage reaches zero (called a "zero voltage transition" in the '142 patent), the non-conducting switches in the bridge are turned on. Although the described system does, at least in theory, provide a system that may reduce stresses on the switching transistors during operation of the conversion circuit, multiple monitoring circuits are required. In particular, the described system requires monitoring circuitry to monitor output voltage from the converter on the secondary side of the transformer, as well as to monitor voltage across the switching network on the primary side. This can increase complexity and cost of the power converter. Under certain conditions, the system described in the '142 patent may also be sensitive to noise and transients in the switching network, which could affect the sensing of a zero voltage condition, and thus the operation of the system.

In light of the above and other prior art, there remains a need for power conversion circuits that balance reduction of switching component stress and simplicity of control.

SUMMARY OF THE INVENTION

The present invention address many of the challenges presented by the above described and other prior designs. Instead of requiring a separate monitoring circuit to check for a zero voltage transition point in the switching network, a circuit according to the present invention controls operation of both switching and clamping transistors based on output bus voltage during normal operation. During a start-up mode of operation, a microprocessor can be used to control the switching and clamping transistors according to a preset cycle until the output voltage reaches a desired starting level.

In one illustrative embodiment, a power converter includes a current source providing an input current, a transformer having primary and secondary windings, a switch network coupling the current source and the primary winding, and a clamping circuit coupled to the switch network. An output bus is coupled to the secondary winding and provides an output voltage. A control circuit has inputs based on the output voltage and the input current, and generates switch network control signals based on those inputs. The control circuit also generates clamping circuit control signals based on the switch network control signals. The power converter may also include a start-up control circuit configured to selectively control the switch network and the clamping circuit so as to raise the output voltage to a desired level. In some illustrative embodiments, the switch network is a full bridge, and the clamping circuit includes first and second clamping switches.

BRIEF DESCRIPTION OF THE DRAWINGS

FIG. 14 is a table showing various control signal values during start-up of the power conversion circuit of FIG. 1.

DETAILED DESCRIPTION OF THE PREFERRED EMBODIMENTS

Figure 1:
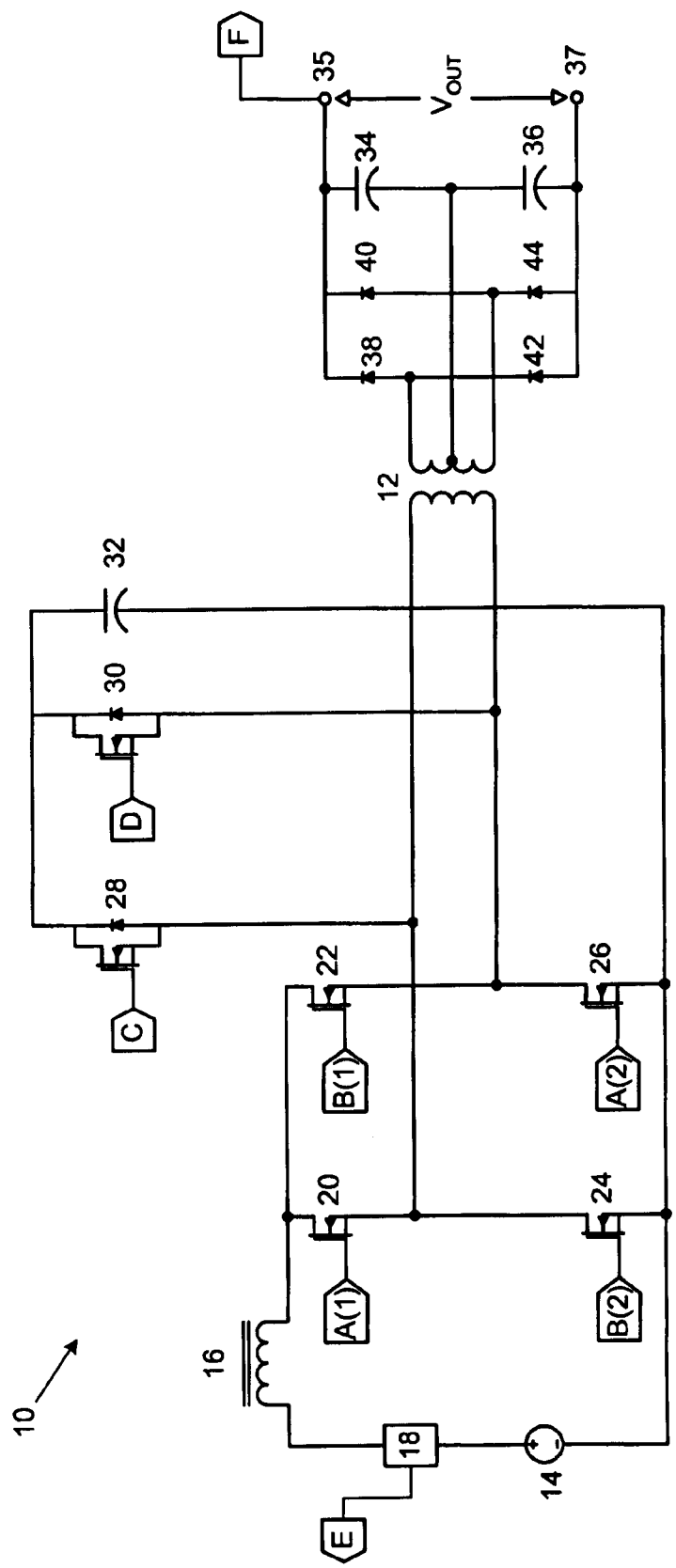
FIG. 1 is a schematic diagram of a power conversion circuit according to an illustrative embodiment of the invention.

FIG. 1 is a schematic diagram of a power conversion circuit 10 according to an illustrative embodiment of the invention. Power conversion circuit 10 includes a transformer 12. In one embodiment, transformer 12 has a 1:1 winding ratio, but may have other winding ratios in other configurations. The primary side of transformer 12 is shown to the left in FIG. 1. Voltage source 14 may be a rectified DC input (e.g., rectified AC line input), DC input supplied by a battery, or other DC input. Coupled to voltage source 14 is a boost inductor 16. A Hall effect transformer 18 or other appropriate current sensor is interposed between voltage source 14 and inductor 16, and provides an output signal E (the purpose of which is described below). Voltage source 14 and inductor 16 are coupled to the primary winding of transformer 12 by switch transistors 20, 22, 24 and 26. Switch transistors 20, 22, 24 and 26 form a full bridge switch network. Switch transistors 20, 22, 24 and 26 are controlled by signals A(1), B(1), B(2) and A(2) applied to their respective gates. When signals A(1) and A(2) are high and signals B(1) and B(2) are low, current flows through the "A" diagonal of the bridge by passing through high side transistor 20, through the primary winding of transformer 12, and then through low side transistor 26. When signals A(1) and A(2) are low and signals B(1) and B(2) are high, current flows through the "B" diagonal of the bridge by passing through high side transistor 22, through the primary winding of transformer 12 (now in the opposite direction), and then through low side transistor 24. When signals A(1), A(2), B(1) and B(2) are all high, conversion circuit 12 is in a shorted primary condition, and current flows to ground from the output of boost inductor 16 through switch transistors 20, 22, 24 and 26, bypassing the primary winding of transformer 12.

Clamping switch transistors 28 and 30, together with clamping capacitor 32, are located on the AC side of the bridge. In other words, the source of clamping switch transistor 28 is coupled to the junction between the source of transistor 20 and the primary winding of transformer 12, and the source of clamping switch transistor 30 is coupled to the junction between the source of transistor 22 and the primary winding of transformer 12. Also shown as part of transistors 28 and 30 are body diodes which allow current to flow from the sources to the drains of transistors 28 and 30. Body diodes may (and typically would) also be present in transistors 20, 22, 24 and 26, but are omitted so as not to obscure the drawing. Clamping switch transistor 28 is controlled by signal C applied to its gate. Clamping switch transistor 30 is controlled by signal D applied to its gate. When signals A(1), A(2) and C are high and signals B(1), B(2) and D are low, clamping switch transistor 28 and clamping capacitor 32 connect the primary side of transformer 12 to ground. When signals A(1), A(2) and C are low and signals B(1), B(2) and D are high, clamping switch transistor 30 and clamping capacitor 32 connect the primary side of transformer 12 to ground.

On the secondary side of the transformer, an output voltage $V_{OUT}$ is provided across an output bus formed by terminals 35 and 37. Diodes 38, 40, 42 and 44 form a rectifying bridge coupling the secondary winding of transformer 12 to the output bus. Capacitors 34 and 36 form a voltage doubler. A signal F, the purpose of which is described below, is tapped from the output bus.

Figure 2:
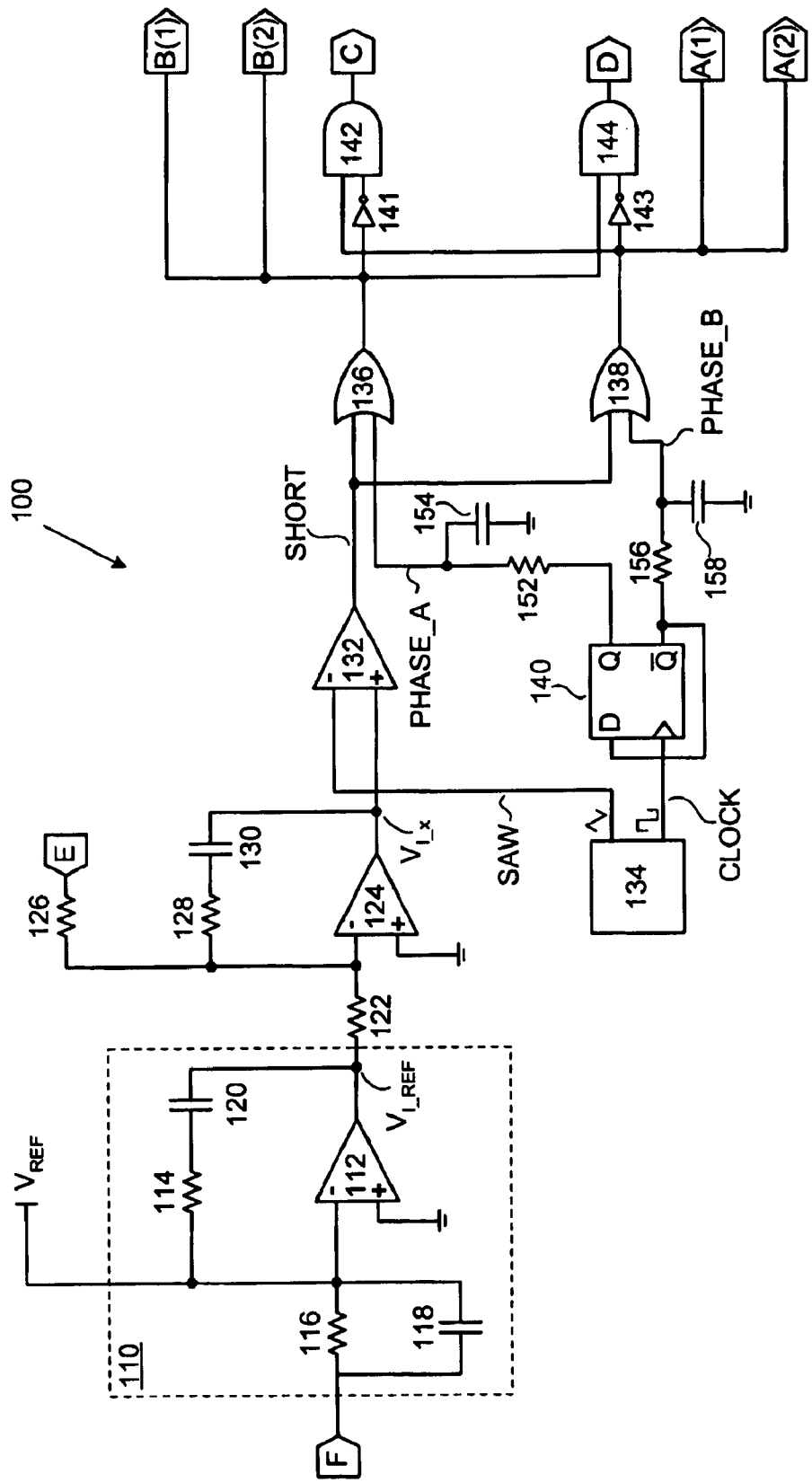
FIG. 2 is a schematic diagram of a control circuit for the normal operating mode of the power conversion circuit of FIG. 1 according to an illustrative embodiment of the invention.

FIG. 2 is a schematic diagram of the control circuitry 100 for power conversion circuit 10 during normal operating mode. As used herein, "normal operating mode" refers to a state in which power conversion circuit 10 is being used to provide a desired voltage output. Conversely, "start-up mode" refers to a state in which power conversion circuit 10 is being initially activated (e.g., from a condition in which the entire system is turned off or otherwise substantially powered down), and in which various circuit components are being readied for normal operating mode. One input to control circuitry 100 is the signal F, a feedback signal from the output bus (FIG. 1). Output voltage feedback signal F and a reference voltage $V_{REF}$ are provided to a Proportional Integrator Differentiator (PID) 110 formed by operational amplifier (op amp) 112, resistors 114 and 116, and capacitors 118 and 120. The output signal of PID 110, labeled $V_{1\_REF}$, is provided through resistor 122 to the inverting node of op amp 124. Also provided to the inverting node of op amp 124, through resistor 126, is the signal E generated from Hall effect transformer 18 (FIG. 1) measuring current between voltage source 14 and boost inductor 16. A feedback loop having resistor 128 and capacitor 130 connects the output node and inverting node of op amp 124. The output signal $V_{1\_x}$ from op amp 124 is then fed to the non-inverting input of comparator 132. The inverting input of comparator 132 receives the saw tooth waveform signal SAW from carrier generator 134. The output of comparator 132, labeled SHORT, is fed to one input of OR gate 136 and to one input of OR gate 138.

Carrier generator 134 also provides a clocking signal CLOCK to flip flop 140. The clocking signal has the same frequency as the SAW signal. Flip flop 140 then outputs two signals, labeled PHASE_A and PHASE_B, that are respectively provided as inputs to OR gates 136 and 138 via RC networks 152, 154 and 156, 158. The SHORT signal is provided as a second input to OR gates 136 and 138. The output of OR gate 136 then provides the control signals B(1) and B(2) to the gates of switch transistors 22 and 24. The output of OR gate 138 provides the control signals A(1) and A(2) to the gates of switch transistors 20 and 26. Control signal C for clamping switch transistor 28 is provided by AND gate 142, the inputs to which are the inverted output of OR gate 136 (via inverter 141) and the non-inverted output of OR gate 138. Control signal D for clamping switch transistor 30 is provided by AND gate 144, the inputs to which are the inverted output of OR gate 138 (via inverter 143) and the non-inverted output of OR gate 136.

Figure 3:
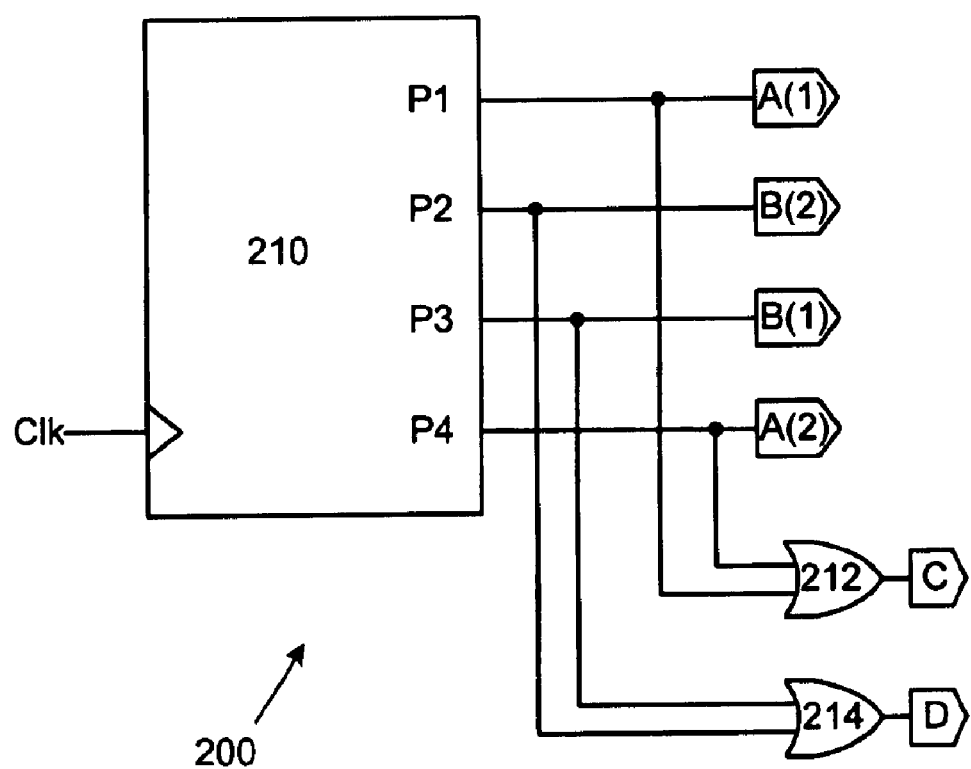
FIG. 3 is a schematic diagram of a control circuit for start up mode of the power conversion circuit of FIG. 1 according to an illustrative embodiment of the invention.

FIG. 3 shows one embodiment of control circuitry 200 for power conversion circuit 10 during start-up mode. A microcontroller 210 receives a system clocking signal Clk (which could be different from the CLOCK signal) and provides four outputs P1–P4 that respectively provide the control signals A(1), B(2), B(1) and A(2) for switch transistors 20, 26, 22 and 24. As described in more detail below, the outputs P1–P4 cycle through a predetermined sequence. The P1 and P4 signals are input to OR gate 212, the output of which is the signal C controlling clamping switch transistor 28. The P2 and P3 signals are input to OR gate 214, the output of which is the signal D controlling clamping switch transistor 30.

Figure 4:
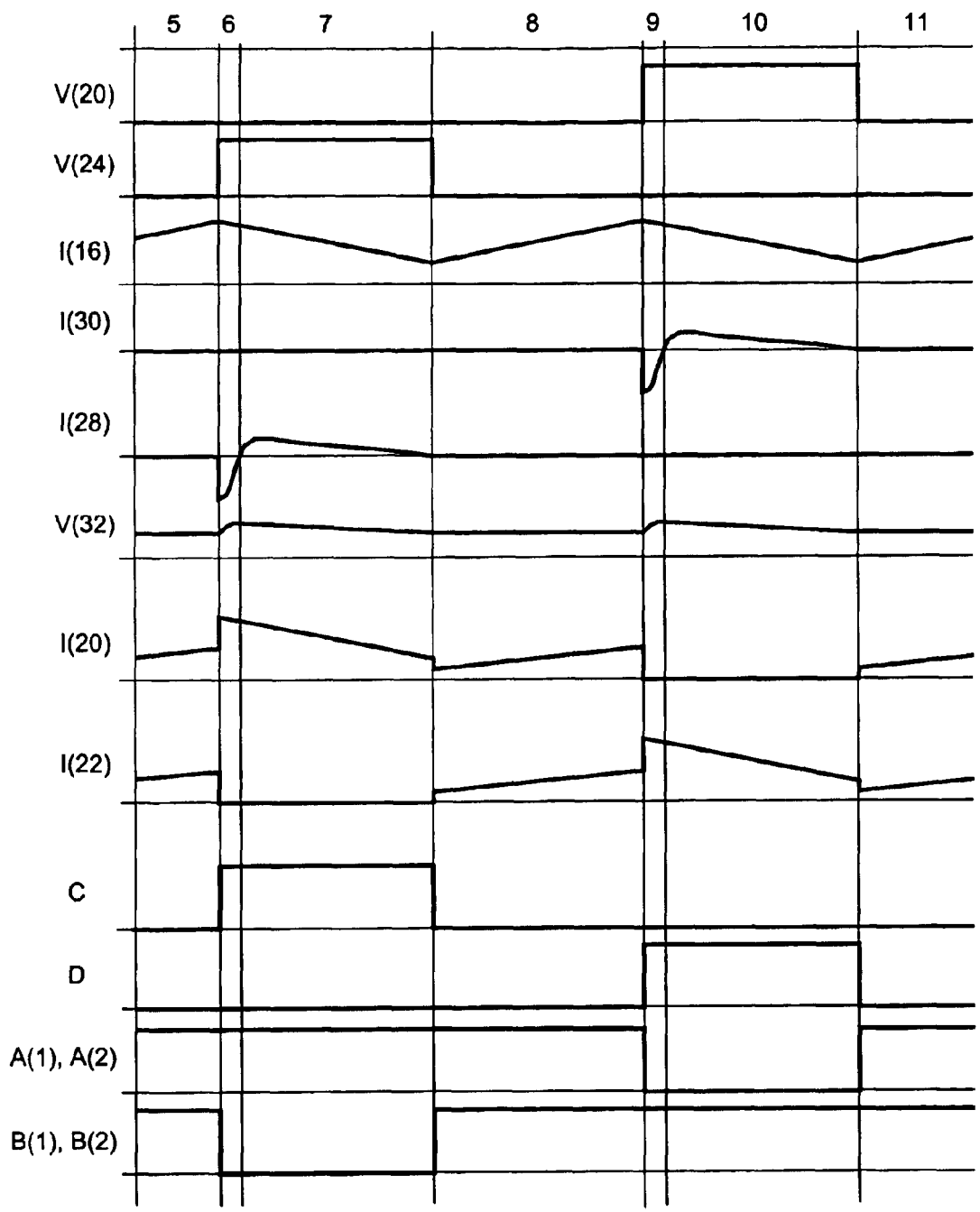
FIG. 4 is a timing diagram of the power conversion circuit of FIG. 1 during normal operating mode.
Figure 5:
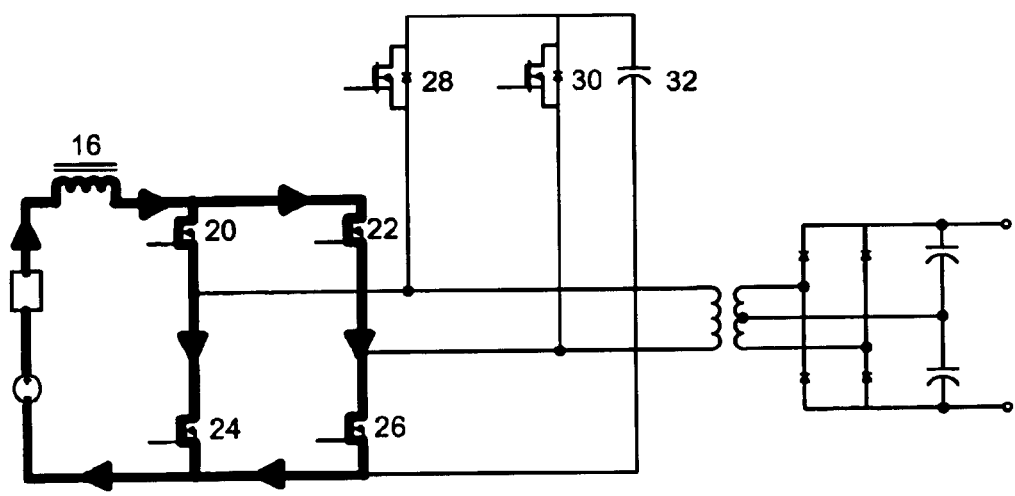
FIGS. 5–11 are diagrams showing current flows through the power conversion circuit of FIG. 1 during normal operating mode.

FIG. 4 is a timing diagram showing waveforms for various portions of power conversion circuit 10 during normal operating mode. Current flow through power conversion circuit 10 during various phases of normal operating mode are shown in FIGS. 5–11. The portion of the FIG. 4 timing diagram to which each of FIGS. 5–11 corresponds is indicated at the top of FIG. 4 by a numeral corresponding to the appropriate current diagram. At the beginning of a normal operating mode cycle, both bridge diagonals (switch transistors 20 & 26 and switch transistors 22 & 24) are first turned ON. As shown in FIG. 5, the primary side of transformer 12 is thereby short circuited (hereinafter referred to as "shorted primary condition"), and current flows from boost inductor 16 to ground through switch transistors 20 and 24 and through switch transistors 22 and 26. As shown in FIG. 4, current I(16) through boost inductor 16 ramps upward, as do the currents I(20) and I(22) through switch transistors 20 and 22. Although not shown, the currents I(24) and I(26) through switch transistors 24 and 26 would similarly ramp upward. The ON or OFF states of switch transistors 20, 22, 24 and 26 and of clamping transistors 28 and 30 are also shown in FIG. 4. Specifically, the control signals A(1), A(2), B(1), B(2), C and D are high when, respectively, switch transistors 20, 26, 22 and 24 and clamping transistors 28 and 30 are conducting (ON), and are low when the respective transistors are not conducting (OFF).

Figure 6:
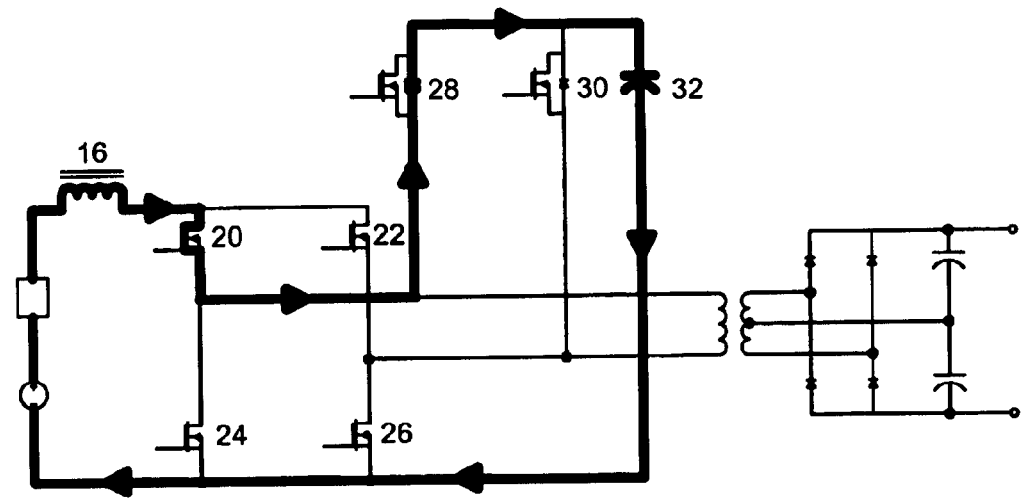

In the next phase of a normal operating mode cycle, switch transistors 22 and 24 are turned OFF, and transistor 28 is simultaneously turned ON. As shown in FIG. 4, signals A(1) and A(2) remain high, signals B(1) and B(2) go low, and signal C goes high. As shown in FIG. 6, transformer leakage inductance initially causes current to flow through the body diode of clamping transistor 28 and charge capacitor 32. This initial current flow to capacitor 32 is also shown in FIG. 4 as a negative current I(28). Current I(16) through boost inductor 16 also begins to ramp downward, releasing the energy stored while the bridge was in the shorted primary condition. Through using boost inductor 16 in this manner, the voltage across the transformer primary winding (and across $V_{OUT}$, as the transformer has a 1:1 winding ratio) can be increased above the voltage $V_{IN}$ supplied by voltage source 14.

Figure 7:
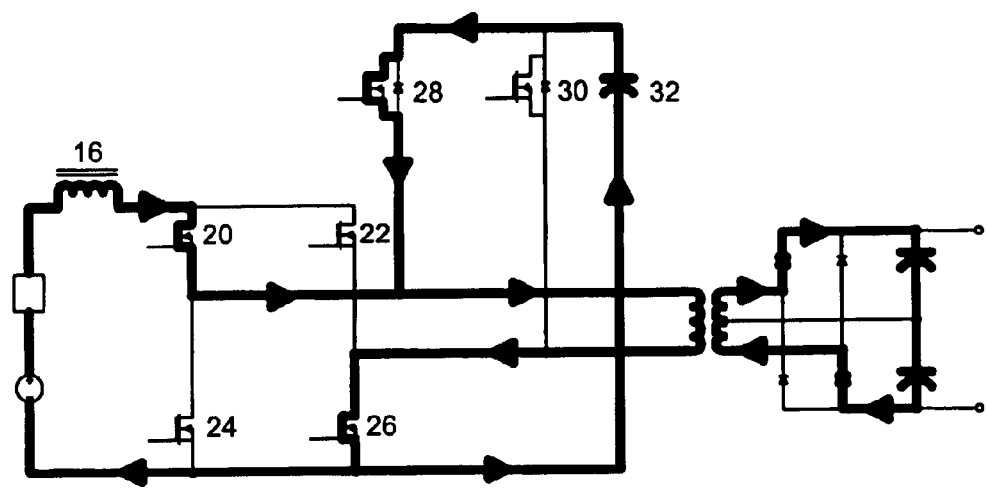

As capacitor 32 becomes charged, the current through the body diode of transistor 28 decreases; although not shown in FIGS. 5–11, there would be a period during which current flows to capacitor 32 and also to the primary winding of transformer 12. Ultimately, current starts flowing back through the drain and source of transistor 28, and into primary winding of transformer 12, as shown in FIG. 7. As shown in FIG. 4, current I(28) flowing through transistor 28 becomes positive. Boost inductor current I(16) continues to ramp downward and release the energy stored during the shorted primary condition. The charge on capacitor 32 is also drained, as shown in FIG. 4 by the falling V(32).

Figure 8:
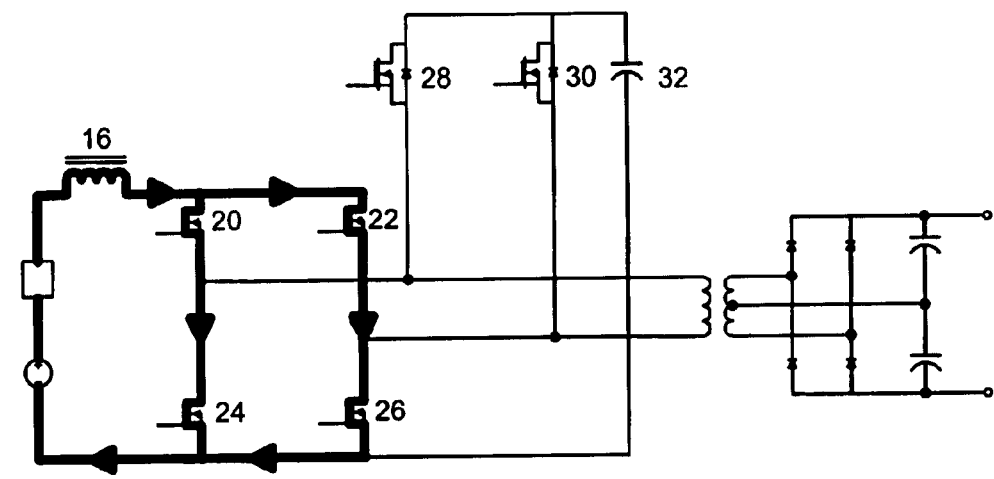

In the next phase, and as seen in FIG. 8, the bridge returns to shorted primary condition by turning ON switch transistors 22 and 24. Clamping transistor 28 is simultaneously turned OFF. As shown in FIG. 4, the B(1) and B(2) signals go high and the C signal goes low. Upon return to shorted primary condition, the voltage across switch transistors 22 and 24 (which was previously the reflected $V_{OUT}$) drops to zero. Because the bridge is again in a shorted primary condition, current I(16) through boost inductor 16 begins ramping upward, storing more energy.

Figure 9:
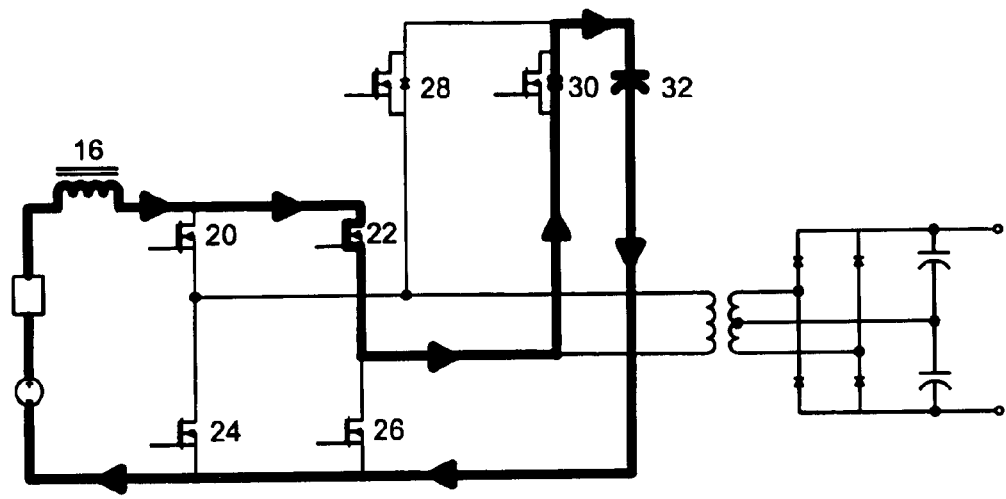

In the next phase, switch transistors 20 and 26 are switched OFF and clamping transistor 30 is simultaneously turned ON. As shown in FIG. 4, the A(1) and A(2) signals go low and the D signal goes high. As seen in FIG. 9, current then flows through the body diode of transistor 30 and charges capacitor 32. This is also reflected in FIG. 4, where I(30) is negative and V(32) is increasing. Because switch transistor 20 is now OFF, there is a reflected $V_{OUT}$ voltage across the transistor (as well as across transistor 26). Current I(16) through boost inductor 16 also begins to ramp downward, releasing the energy stored during the previous shorted primary condition (FIG. 8). As capacitor 32 becomes charged, the current through the body diode of transistor 30 decreases. Although not shown in FIGS. 5–11, there would again be a period during which current flows to capacitor 32 and also to the primary winding of transformer 12 (but now in the opposite direction through the winding).

Figure 10:
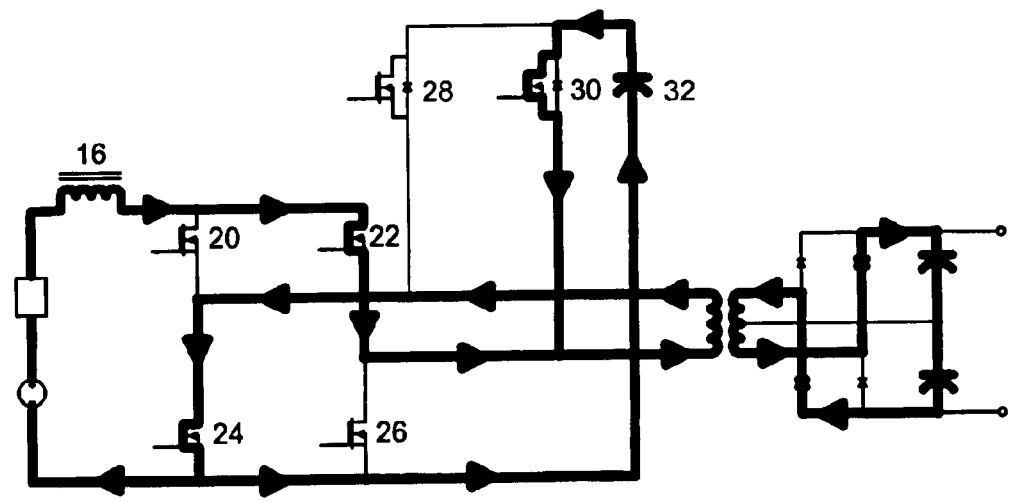
Figure 11:
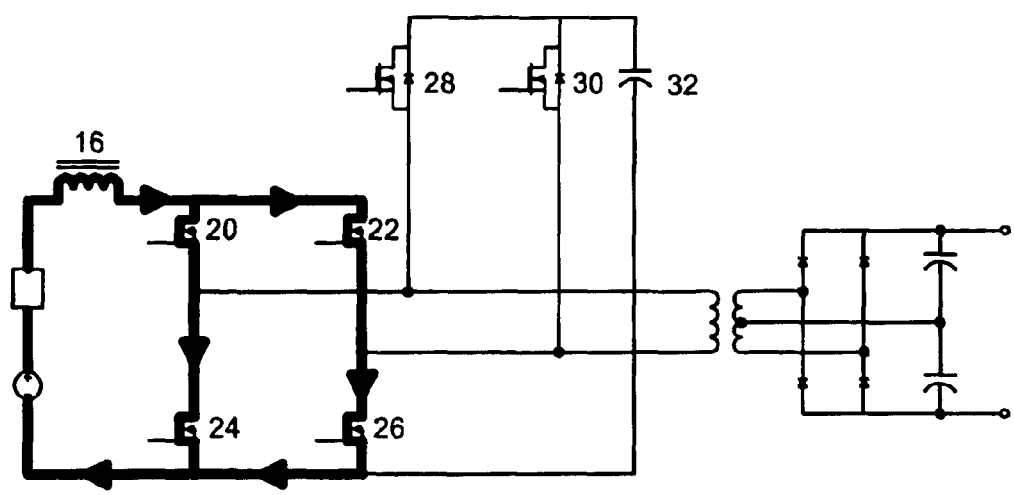

As shown in FIG. 10, current ultimately flows back through the drain and source of transistor 30 and into the primary winding of transformer 12. As also shown in FIG. 4, I(30) is positive and V(32) is decreasing. Current I(16) through boost inductor 16 continues to ramp downward and release the energy stored during the shorted primary condition of FIG. 8, and a voltage is maintained across transistors 20 and 26 (not shown in FIG. 4). The cycle then repeats in FIG. 11 as switch transistors 20 and 26 are both turned back ON and transistor 30 is simultaneously turned OFF, returning to a shorted primary condition. As seen in FIG. 4, signals A(1) and A(2) go high and signal D goes low. Until the bridge returns to shorted primary condition, a voltage remains across transistors 20 and 26, but returns to zero when those transistors are turned back ON.

During normal operating mode, the voltage in the primary winding of transformer 14 is clamped at the voltage level of clamping capacitor 32. Voltage stresses on switch transistors 20, 22, 24 and 26 are thereby minimized.

While power conversion circuit 10 is in normal operating mode, the output voltage $V_{OUT}$ is controlled by increasing or decreasing the duration of the shorted primary condition during each half of the cycle (i.e., increasing or decreasing the amount of time during each half-cycle when switch transistors 20, 22, 24 and 26 are all ON). If $V_{OUT}$ rises above the desired level, the energy stored in boost inductor 16 is reduced by decreasing the duration of the shorted primary condition. If $V_{OUT}$ falls below the desired level, the energy stored in boost inductor 16 is increased by increasing the duration of the shorted primary condition. This is further illustrated in FIG. 12, which shows a series of waveforms associated with control circuit 100 when power conversion circuit 10 is in normal operating mode.

Figure 12:
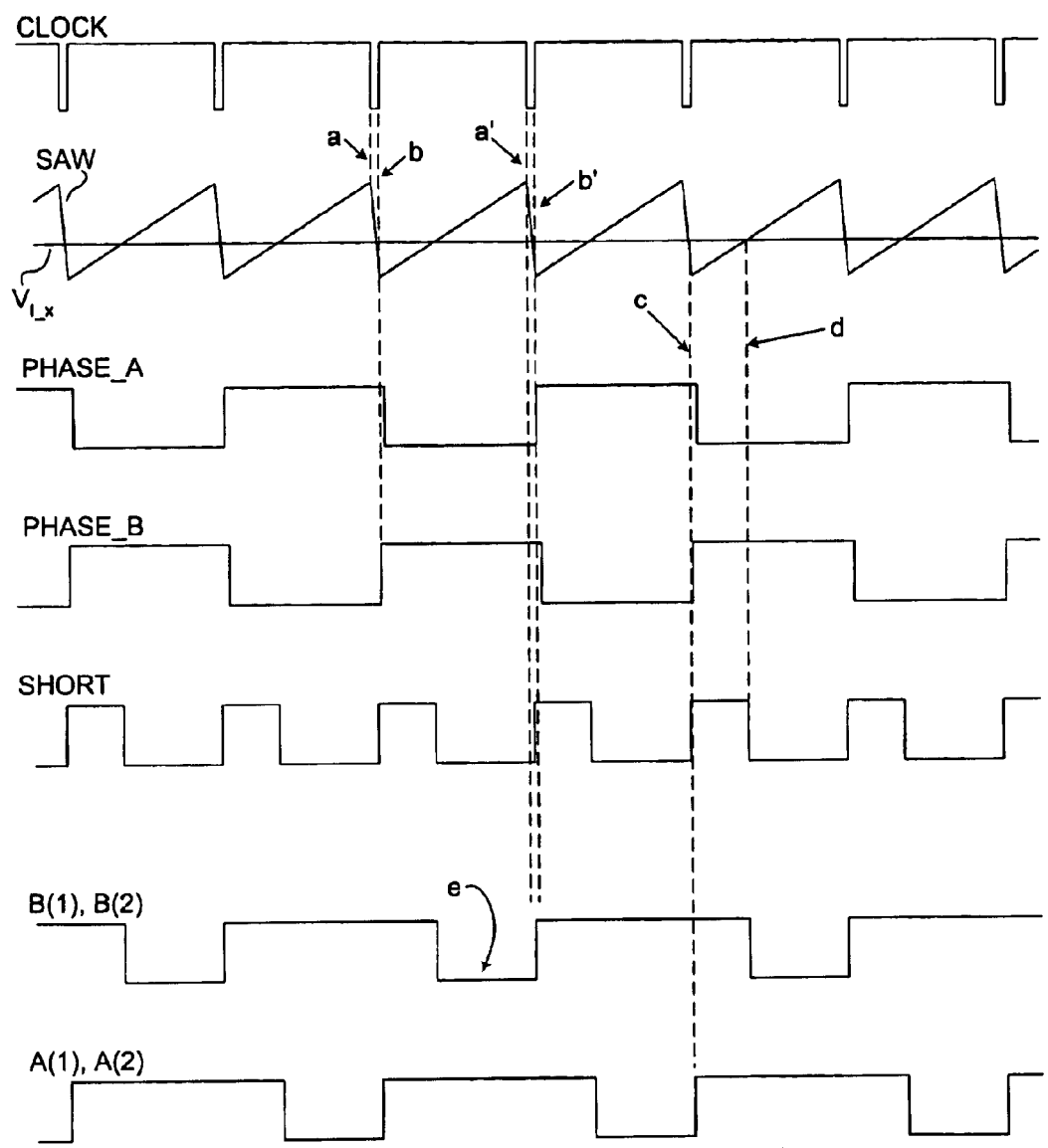
FIG. 12 is a timing diagram explaining operation of the control circuitry of FIG. 2 during normal operating mode of the power conversion circuit of FIG. 1.

In order to determine whether $V_{OUT}$ is at, above or below the desired output voltage level, voltage signal F is tapped from the output bus (FIG. 1) and input to control circuit 100 (FIG. 2). Signal F is compared with $V_{REF}$ in PID 110, which provides an output signal $V_{1\_REF}$ that is a measure of the amount by which $V_{OUT}$ is above or below the desired level. $V_{REF}$ is opposite in polarity to the desired $V_{OUT}$, and its magnitude is chosen based on the desired magnitude of $V_{OUT}$. The $V_{1\_REF}$ signal is then provided to op amp 124, as is the signal E. Signal E, which is generated by Hall effect transformer 18 (FIG. 1), is a voltage signal based on the current flowing to boost inductor 16. Op amp 124 then provides output signal $V_{1\_x}$, which is a measure of the amount by which current through boost inductor 16 is above or below the required level to generate $V_{OUT}$. The $V_{1\_x}$ signal is compared against the SAW signal from carrier generator 134 at comparator 132. As shown in FIG. 12, the SAW signal has the same frequency as the CLOCK signal from carrier generator 134. In an illustrative embodiment, this frequency is between 30 kHz to 50 kHz. The SAW signal begins falling when the CLOCK signal goes low, as shown by the vertical dashed lines a and a'. The SAW signal begins rising when the CLOCK signal goes high, as shown by vertical dashed lines b and b'.

As shown by dashed vertical line c in FIG. 12, the intersection of the $V_{1\_x}$ signal with the falling portion of the SAW signal corresponds to the SHORT signal going high. Conversely, the SHORT signal goes low when the $V_{1\_x}$ signal intersects with the rising portion of the SAW signal, as shown by dashed vertical line d. As can be appreciated from FIG. 12, an increase of $V_{1\_x}$, signal amplitude increases the width of the SHORT signal pulse. As the $V_{1\_x}$ signal amplitude decreases, the width of the SHORT signal pulse narrows.

As seen in FIGS. 2 and 12, the SHORT signal is used with the PHASE_A and PHASE_B signals to generate control signals A(1), A(2), B(1) and B(2). The PHASE_A and PHASE_B signals are generated by flip flop 140, which outputs PHASE_A and PHASE_B as complementary square wave signals at ports Q and $\overline{Q}$. In one embodiment, a small turn-off delay of approximately 300 ns is built into control circuitry 100 to ensure that PHASE_A and PHASE_B are never low at the same time. This delay can be implemented in various manners. In one embodiment, the delay is created by placing a RC network (composed of resistor 152 and capacitor 154) between the Q output of flip flop 140 and OR gate 136 and by placing another RC network (composed of resistor 156 and capacitor 158) between the $\overline{Q}$ output of flip flop 140 and OR gate 138. In this manner, the delay can be adjusted by increasing or decreasing the time constants of the two RC networks.

The SHORT signal and the PHASE_A signal are input into OR gate 136; the output of OR gate 136 is fed to the gates of switch transistors 22 and 24 as the B(1) and B(2) signals. As shown in FIG. 12, the B(1) and B(2) signals are thus high (and switch transistors 22 and 24 are ON) whenever PHASE_A or the SHORT signal is high. Similarly, the SHORT signal and PHASE_B signals are input into OR gate 138. As also shown in FIG. 12, the A(1) and A(2) signals are thus high (and switch transistors 20 and 26 are ON) whenever PHASE_B or the SHORT signal is high.

The PHASE_A and PHASE_B signals toggle (i.e., one goes high and one goes low) based upon the CLOCK signal going high. As shown by dashed vertical lines b and b' in FIG. 12, the PHASE_A and PHASE_B signals change from low to high when the clock signal goes high. Whenever PHASE_A or PHASE_B changes from high to low, the above-mentioned delay causes the then-high signal to toggle low 300 ns after the low signal toggles high.

As seen in FIG. 12, the primary side of power conversion circuit 10 is returned to the shorted primary condition when the SHORT signal goes high. For example, in the second low portion of the B(1), B(2) waveform labeled e, B(1) and B(2) are low when both the SHORT and PHASE_A signals are low. B(1) and B(2) go from low to high when either of the SHORT or PHASE_A signals goes high. Because the leading edge of the SHORT signal corresponds to the intersection of $V_{1\_x}$ and the falling part of the SAW signal, and because the falling part of the SAW signal ends at the same point that PHASE_A goes high (line b'), the SHORT signal will go high slightly before PHASE_A toggles high. Similarly, the SHORT signal will go high before the PHASE_B signal toggles high. However, the width of the SHORT signal pulse is dominated by the intersection of $V_{1\_x}$ with the rising portion of the SAW signal. The width of the downward portion of the SAW signal is very small by comparison to the rising portion, resulting in a very steep downward slope for the falling portion. The diagonal formed by transistors 20 and 26 is therefore turned ON at roughly the same point in each cycle. Similarly, the diagonal formed by transistors 22 and 24 is turned ON at roughly the same point in each cycle. However, the point in a cycle at which one of the diagonals turns OFF can vary significantly.

As seen in FIGS. 1 and 2, clamping transistors 28 and 30 are controlled exclusively during normal operating mode by the timing of signals which control switching of the diagonals formed by transistors 20 and 26 and by transistors 22 and 24. Specifically, clamping transistor 28 switches ON when the output of AND gate 142 goes high. The inputs to AND gate 142 are the output of OR gate 138 and the inverse of the output of OR gate 136. Similarly, the output of AND gate 144 controls clamping transistor 30. The AND gate 144 inputs are the output of OR gate 136 and the inverse of the output of OR gate 138. By operating in this manner, the switch and clamping transistors are controlled by the same control circuitry used to regulate voltage output $V_{OUT}$ of the power converter.

Figure 13:
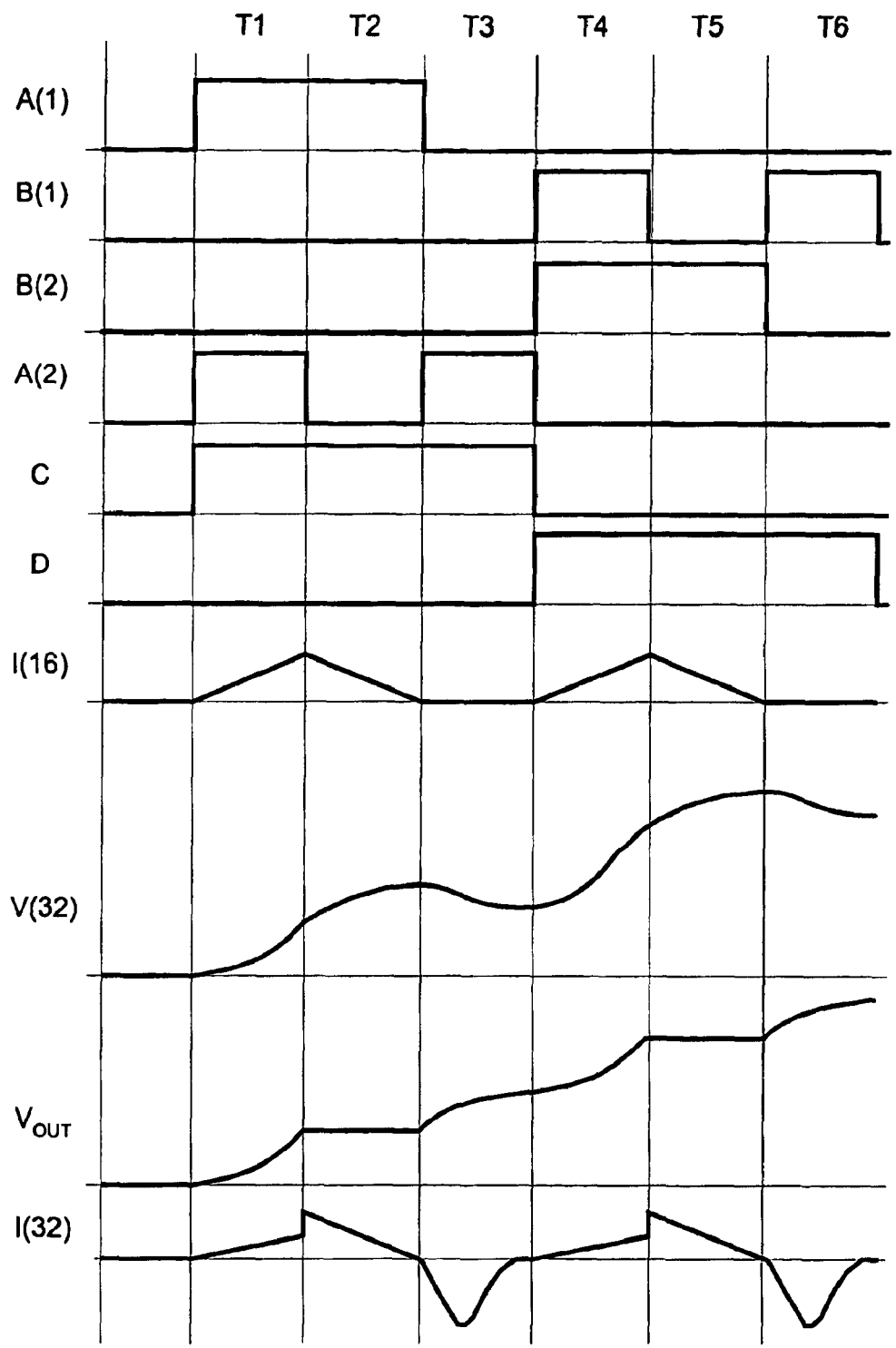
FIG. 13 is a timing diagram of the power conversion circuit of FIG. 1 during start-up mode.

When power conversion circuit 10 is initially started, i.e. during start-up mode, it is advantageous to gradually raise the voltage across the output bus before operating power conversion circuit 10 as described in connection with FIGS. 4–12. Accordingly, switch transistors 20, 22, 24 and 26 and clamping transistors 28 and 30 are controlled somewhat differently during start-up mode, as shown in FIGS. 3, 13 and 14. During start-up mode, and as shown in FIG. 3, signals A(1), A(2), B(1) and B(2) are provided by microcontroller 210. Signal C is output by OR gate 212, the inputs to which are signals A(1) and A(2). Signal D is output by OR gate 214, the inputs to which are signals B(1) and B(2).

FIG. 13 is a timing diagram for power conversion circuit 10 during start-up mode. FIG. 14 is a table showing the output of pins P1–P4 of microcontroller 210, and thus the state of signals A(1) through D, during successive clock cycles. Beginning at time T1, which could correspond to a first cycle of a system clock or other periodic function, pins P1 and P4 of microcontroller 210 are high and pins P2 and P3 are low. The A(1), A(2) and C signals are thus high, while the B(1), B(2) and D signals are low. At time T2, pin P1 is high and pins P2–P4 are low. This results in the A(1) and C signals being high, with the A(2), B(1), B(2) and D signals being low. The sequence progresses according to the table of FIG. 14 and as shown in FIG. 13. At time T7 (not shown), the sequence begins over again. The sequence continues until $V_{OUT}$ reaches a desired level, at which point the previously described control scheme for normal operating mode begins. In addition to the A(1), A(2), B(1), B(2), C and D signals, FIG. 13 also shows the current I(16) through boost inductor 16, the voltage V(32) on capacitor 32, output voltage $V_{OUT}$, and current I(32).

Although specific examples of carrying out the invention have been described, those skilled in the art will appreciate that there are numerous variations and permutations of the above described system and techniques that fall within the spirit and scope of the invention as set forth in the appended claims. The circuits and methods described herein are only examples of possible circuits and methods in which the invention can be implemented; other circuits and/or methods could be used. For example, the invention could also be implemented in half-bridge current topologies. As but another example, various polarities could be changed, other components substituted and/or added, certain components deleted, and various components rearranged. These and other modifications are within the scope of the invention, which is only limited by the attached claims.

What is claimed is:

1. A power converter, comprising:

a current source providing an input current;

a transformer having primary and secondary windings;

a full-bridge switch network coupled to the current source and the primary winding and having first and second switch pairs, each switch pair having a high and low side switch and being configurable to pass current to the primary winding through the high side switch and from the primary winding through the low side switch, the switch pairs being configurable to bypass the primary winding;

a clamping circuit having a clamping capacitor and connected, for each switch pair, to a junction shared by the clamping circuit, the high side switch, and the primary winding;

an output bus coupled to the secondary winding and providing an output voltage; and a control circuit having inputs based on the output voltage and the input current and configured to generate outputs controlling the switch pairs and the clamping circuit.

2. The power converter of claim 1, wherein the clamping circuit comprises a first clamping switch coupled to the first high side switch and a second clamping switch coupled to the second high side switch.

3. The power converter of claim 2, wherein the control circuit outputs comprise first switch pair control signals, second switch pair control signals, a first clamping switch control signal and a second clamping switch control signal.

4. The power converter of claim 3, wherein the clamping switch control signals are derived from the first and second switch pair control signals.

5. The power converter of claim 3, wherein:
   the first and second switch pair controls signals cause the switch pairs to cycle through phases in which the first switch pair is conducting and the second switch pair is non-conducting, in which the first and second switch pairs are conducting, and in which the second switch pair is conducting and the first switch pair is non-conducting, and
   the first and second clamping switch control signals cause the first clamping switch to be conducting when the second switch pair is non-conducting and cause the second clamping switch to be conducting when the first switch pair is non-conducting.

6. The power converter of claim 1, further comprising a start-up control circuit configured to selectively control the switch pairs and the clamping circuit so as to raise the output voltage to a desired level when the converter is activated from a powered-down condition.

7. The power converter of claim 6, wherein the start-up control circuit selectively activates and de-activates individual switches in each switch pair.

8. The power converter of claim 7, wherein:
   the clamping circuit comprises a first clamping switch coupled to the first high side switch,
   the clamping circuit further comprises a second clamping switch coupled to the second high side switch, and
   the start-up circuit selectively activates and de-activates the first and second clamping switches.

9. The power converter of claim 8, wherein the start-up circuit comprises a controller configured to output a repeating pattern of signals to activate and de-activate the individual switches in each switch pair.

10. A power converter, comprising:
    a current source providing an input current;
    a transformer having primary and secondary windings;
    a switch network coupling the current source and the primary winding;
    a clamping circuit coupled to the switch network;
    an output bus coupled to the secondary winding and providing an output voltage; and
    a control circuit having inputs based on the output voltage and the input current, configured to generate switch network control signals based on the inputs, and configured to generate clamping circuit control signals based on the switch network control signals.

11. The power converter of claim 10, wherein:
    the switch network comprises a full bridge having first and second switch pairs, and
    the clamping circuit comprises first and second clamping switches.

12. The power converter of claim 11, wherein the switch network control signals comprise a first set of control signals controlling the first switch pair and a second set of control signals controlling the second switch pair, and wherein the clamping circuit control signals comprise a first clamping switch control signal and a second clamping switch control signal.

13. The power converter of claim 12, wherein:
    the first and second sets of control signals cause the switch pairs to cycle through phases in which the first switch pair is conducting and the second switch pair is non-conducting, in which the first and second switch pairs are conducting, and in which the second switch pair is conducting and the first switch pair is non-conducting, and
    the first and second clamping switch control signals cause the first clamping switch to be conducting when the second switch pair is non-conducting and cause the second clamping switch to be conducting when the first switch pair is non-conducting.

14. The power converter of claim 10, further comprising a start-up control circuit configured to selectively control the switch network and the clamping circuit so as to raise the output voltage to a desired level when the converter is activated from a powered-down condition.

15. The power converter of claim 14, wherein the start-up control circuit selectively activates and de-activates individual switches in the switch network.

16. The power converter of claim 15, wherein the clamping circuit comprises a clamping switch and the start-up circuit selectively activates and de-activates the clamping switch.

17. The power converter of claim 16, wherein the start-up circuit comprises a controller configured to output a repeating pattern of signals to activate and de-activate the individual switches in the switch network.

18. A power converter, comprising:
    a current source providing an input current;
    a transformer;
    a switch network connected to said current source, said switch network having first and second switch pairs, each switch pair having a high side switch configurable to pass current to said transformer, and a low side switch configurable to pass current from said transformer;
    a clamping circuit, connected to said switch network and said transformer, wherein said clamping circuit has direct electrical connections to opposite ends of a primary winding of said transformer; and
    a control circuit configured to provide switch network control signals, said signals being based at least in part on said input current.

19. The power converter of claim 18, further comprising an output bus coupled to a secondary winding of said transformer and providing an output voltage, wherein said switch network control signals are also based at least in part on said output voltage.

20. The power converter of claim 18, further comprising circuitry to generate clamping circuit control signals using said switch network control signals.

21. The power converter of claim 18, wherein said switch pairs are further configurable to bypass a primary winding of said transformer.

22. The power converter of claim 18, wherein said clamping circuit includes first and second clamping switches connected to first and second ends, respectively, of said primary winding.

* * * * *